United States Patent [19]
Yang

[11] Patent Number: 4,953,205
[45] Date of Patent: Aug. 28, 1990

[54] FLICKERING DEVICE FOR TELEPHONE SETS

[75] Inventor: Tsai T. Yang, Tainan, Taiwan
[73] Assignee: Dah Yang Industry Co., Ltd., Taiwan
[21] Appl. No.: 360,150
[22] Filed: Jun. 1, 1989
[51] Int. Cl.$^5$ .............................................. H04M 1/00
[52] U.S. Cl. ...................................... 379/376; 379/396
[58] Field of Search ............... 379/376, 387, 396, 429, 379/52; 84/464 R

[56] References Cited

U.S. PATENT DOCUMENTS

| | | | |
|---|---|---|---|
| 3,410,964 | 11/1968 | Kelsey | 379/396 |
| 3,585,303 | 6/1971 | Chieffo | 379/52 |
| 3,615,162 | 4/1969 | Barber | 84/464 |
| 4,491,696 | 1/1985 | Haskins et al. | 379/435 |
| 4,653,094 | 3/1987 | Rasmussen et al. | 379/396 |

*Primary Examiner*—Jin F. Ng
*Assistant Examiner*—Jhancy Augustus

[57] ABSTRACT

A flickering device for telephone sets includes a phone housing having all the necessary elements and telephone circuits disposed therein for effecting communication operations with an open section provided in one side of the phone housing, a transparent member installed in the open section of the phone housing, a flickering circuit electrically coupled with the telephone circuits having a plurality of light-emitting elements disposed therein in conjunction with the transparent member for effecting flickering illuminations thereat, and an external power supply connected to the flickering circuit for providing the required power therefrom. Whereby, flickering illuminations will be effected along with the incoming ringing signals and the voice levels of those communicating on the related telephone set during communications.

2 Claims, 4 Drawing Sheets 4,953,205

FLICKERING DEVICE FOR TELEPHONE SETS

BACKGROUND OF THE INVENTION

The present invention relates to a flickering device, and more particularly to a type of flickering device incorporated into a telephone set so that a flickering illumination will be initiated when the telephone rings and during a telephone conversation.

Telephone sets have developed from a simple communication device into multipurpose decorative communications equipment. Therefore, a telephone set in a modern office is required to perform its practical functions of communication and to provide an attractive appearance and a novel structure as well.

The existing telephone sets are normally classified into wire telephone sets and wireless telephone sets each having three major parts: a telephone body; a handset; and a wire connecting portion. In the telephone body, basic telephone circuits are provided for receiving communication information transferred from a telecommunication office and for transmitting communication information delivered from a telephone user. Although the three major parts of a conventional telephone set mentioned above have undergone constant development and renovation, and many styles have been created for the outer appearance thereof, the entire structure is still confined to a conventional "modularized" structure. Therefore, more functional accessories are required for conventional telephone sets in order to promote the communication efficiency and the commercial value thereof in the telecommunication industry. The ringing sound produced by a telephone provides a very good example of this need for more functional accessories because the ringing of a telephone is frequently blamed for breaking the concentration of someone or disrupting a quiet atmosphere. Although the magnitude of the ringing sound in conventional telephone sets can be adjusted, the inconvenience of the ringing sound still exists. It should also be noted that this ringing sound is of little or no use as a signal of an incoming call to those persons who are hard of hearing or deaf.

SUMMARY OF THE INVENTION

It is accordingly a primary object of the present invention to provide a flickering device for telephone sets by which different flickering illuminations will be produced along with the telephone ringing signals. Also, the magnitude of the voices of those communicating on the telephone will be produced along with the telephone ringing signals for presenting visual effects to the user of the telephone set.

These and other objects of the present invention are achieved by the provision of a flickering device for telephone sets comprising: a phone housing having all of the necessary elements and telephone circuits disposed therein for effecting communication operations with an open section provided at one side of said phone housing; a transparent means installed in the open section of said phone housing; a flickering circuit having a plurality of light-emitting elements separately arranged therein disposed on a circuit board of said phone housing and electrically connected to said telephone circuit for providing flickering illumination in conjunction with the incoming ringing signals and the magnitude of the voice of the speaker on the telephone set during communications; and an external power supply coupled with said flickering circuit to provide the required power supply for said light-emitting elements therefrom; whereby, flickering illuminations will be initiated along with an incoming ringing signal and with the magnitude of the voice of the speaker on the telephone set during communications.

Other advantages and characteristics of the present invention will become apparent from the following detailed description of a preferred embodiment of a flickering device for telephone sets when read in conjunction with the accompanying drawings.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 1:
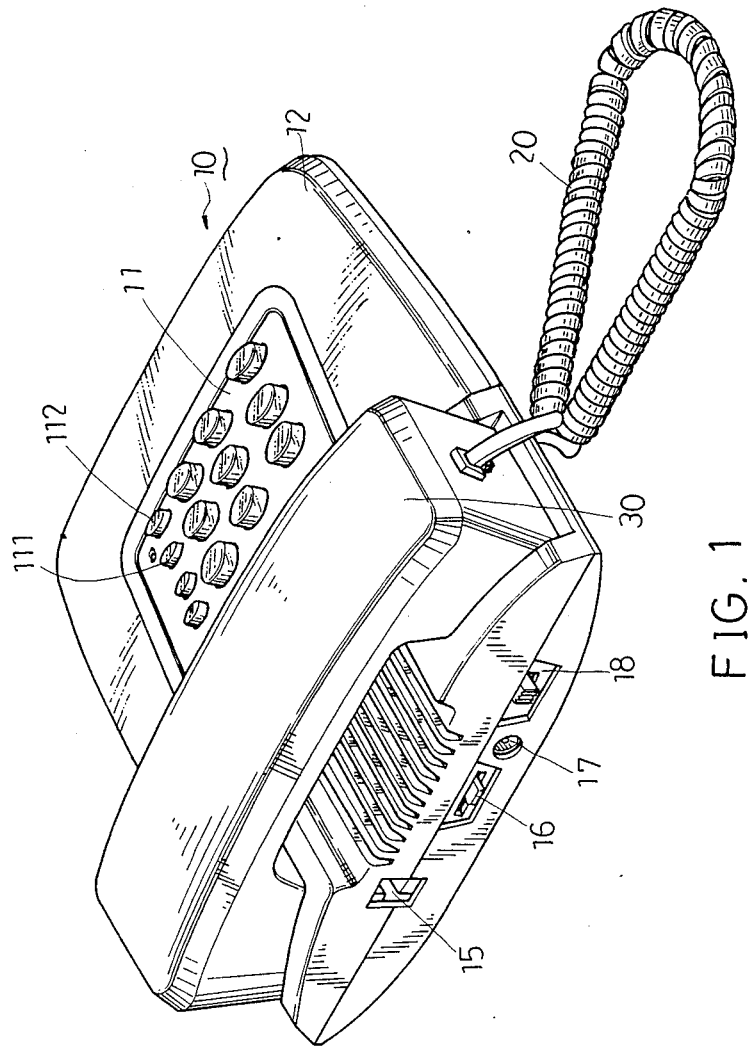
FIG. 1 is a perspective view of a flickering device incorporated into a telephone set according to a preferred embodiment of the present invention.
Figure 2:
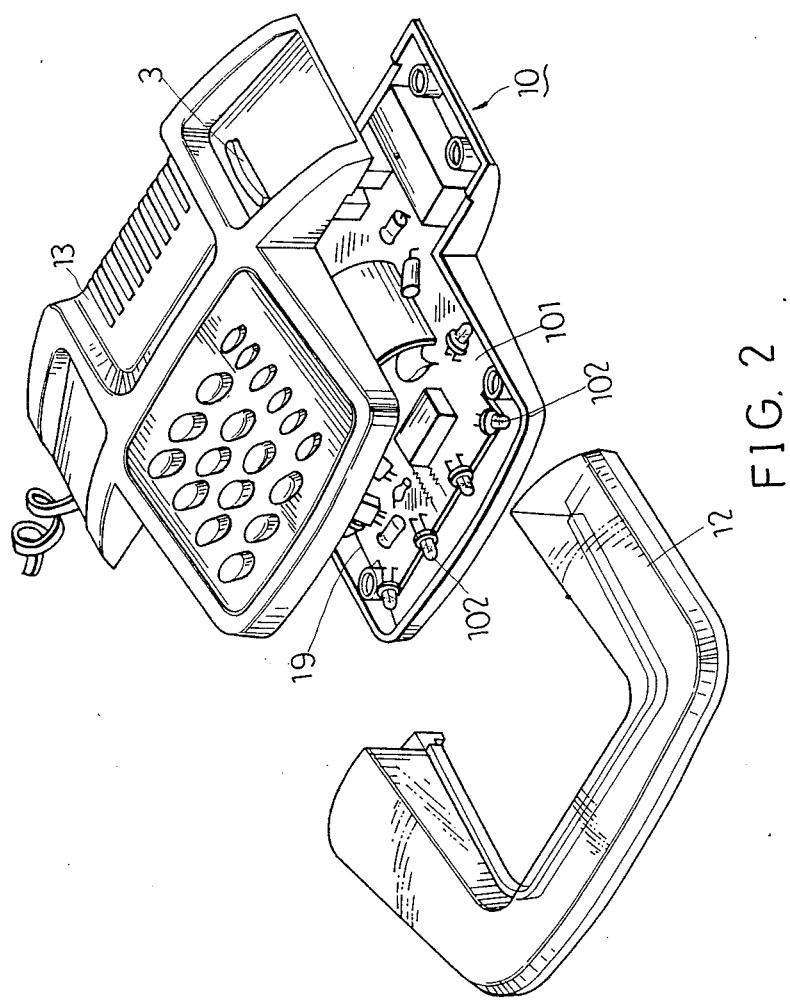
FIG. 2 is an exploded and perspective view of the preferred embodiment shown in FIG. 1.

Referring to FIGS. 1 and 2, the preferred embodiment of a flickering device for telephone sets according to the present invention includes a combination of a phone housing 10 and a handset 30 having a handset cord 20. The phone housing 10 includes a keyboard 11 located on a top surface thereof having a "MEMORY" key 111 and a "HOLD" key 112 provided thereon in addition to the ordinary functional and numeral keys, a transparent member 12 disposed on one side of the phone housing 10; and an input socket 15, a ringing volume control switch 16, an external power socket 17, and a selective switch 18, are provided on another side of the phone housing 10.

As illustrated in FIG. 2, the phone housing 10 also includes a handset retaining seat 13 for receiving the handset 30, a hookswitch 3 which may be operated for cancelling initiating communications and an open section 19 for the installation of the transparent member 12. In addition, a circuit board 101 is installed in the phone housing 10 with a plurality of light-emitting elements 102 separately disposed along a side of the circuit board 101 in conjunction with the necessary elements and telephone circuits provided for performing telephone communications therewith. The disposition pattern and colors of the light-emitting elements 102 (such as LED's or neon lights) can be optionally arranged according to the wishes of the consumers.

Figure 3:
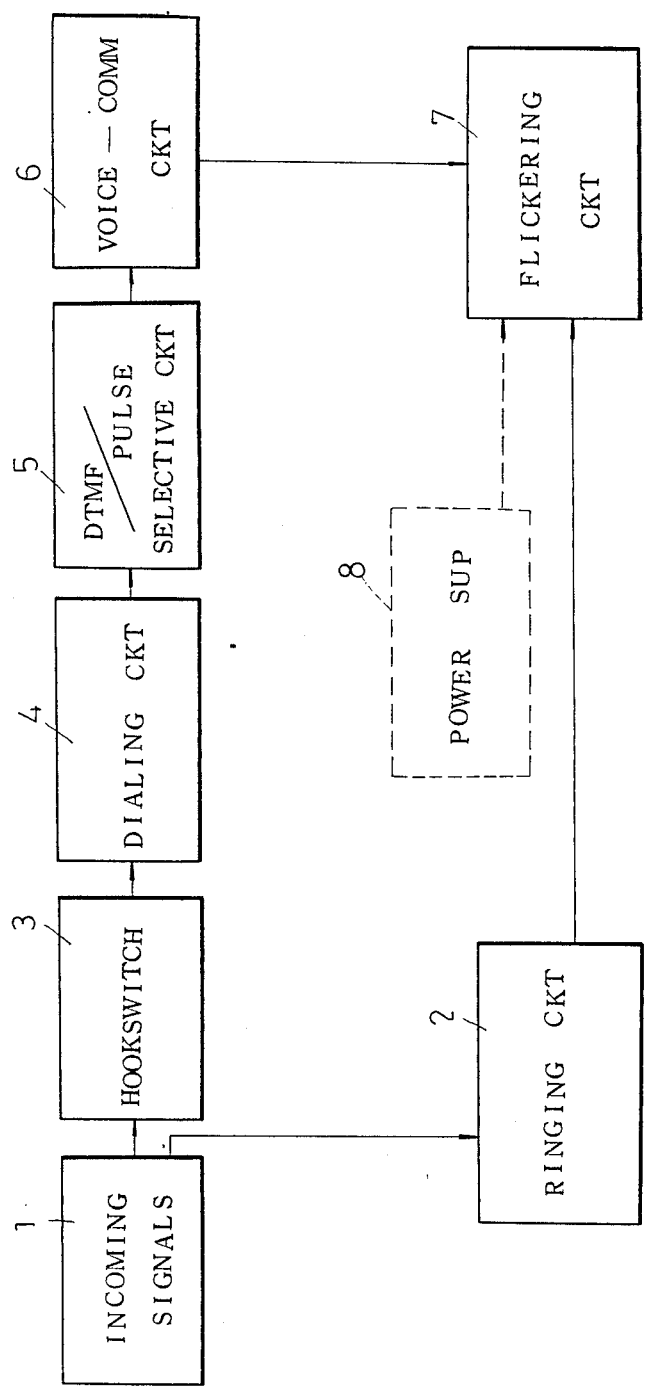
FIG. 3 is a block diagram of the preferred embodiment of FIG. 1.
Figure 4:
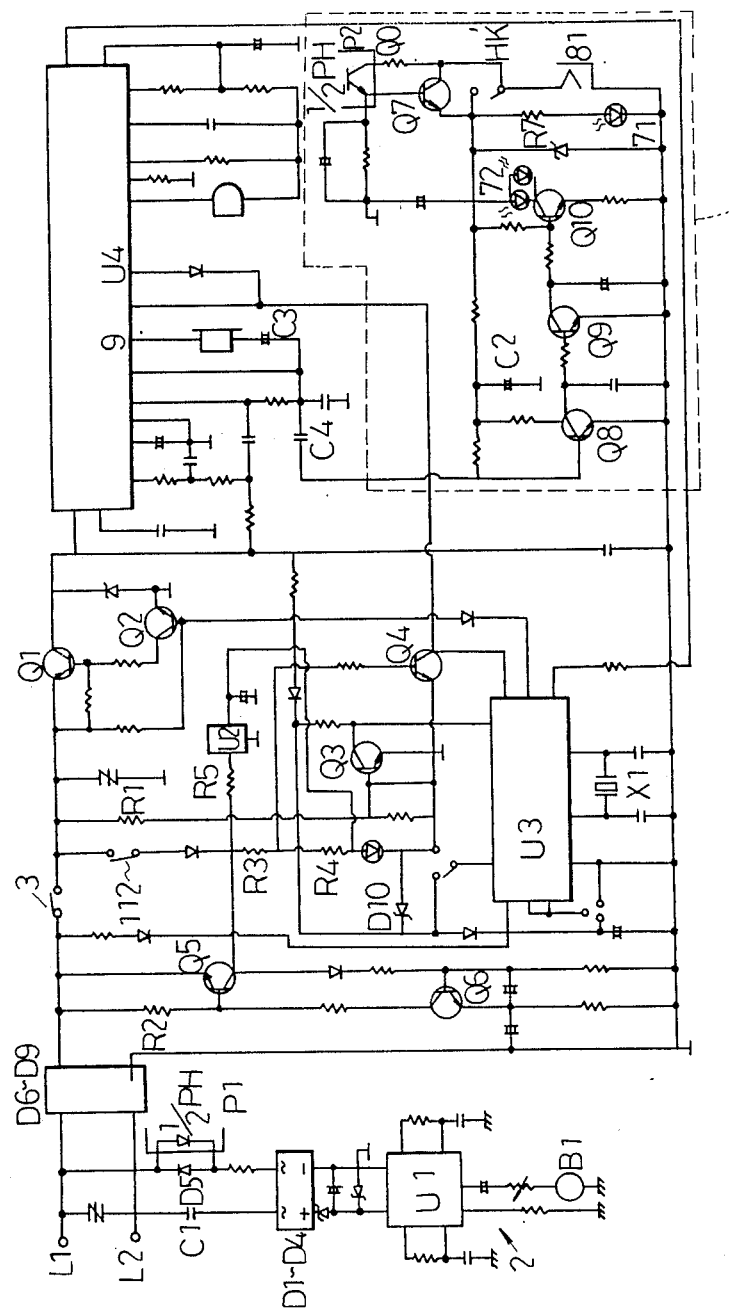
FIG. 4 is a circuit diagram of the preferred embodiment shown in FIG. 1.

Referring to FIGS. 3 and 4, when an external signal 1 is received by the telephone set, the ringing circuit 2 is first activated and then the flickering circuit 7 is energized to initiate the flickering illumination through the light-emitting elements 102. As the handset 30 is lifted up, the hookswitch 3 is turned on and telephone communication is developed by the ordinary telephone circuits including a dialing circuit 4, a selective circuit 5, a receiving circuit 6, and the flickering circuit 7.

The details of these elements will be described by FIG. 4, the external signals coming from lines L1 and L2 will be first coupled to a rectifying circuit D1–D4 through a capacitor C1, for supplying a signal source to the ringing circuit 2. The ringing circuit 2 includes an IC circuit U1, a buzzer B1, a variable resistor VR1 (connected to the ringing volume control switch 16, as shown in FIG. 1), and a photocoupled diode P1 which is connected in parallel with another diode D5 for energizing the flickering circuit 7 and initiating flickering illuminations through the light-emitting elements 102 (as shown in FIG. 1).

If the handset 30 is picked up when the signal source has passed through the rectifying circuit D1–D4, the hookswitch 3 will be closed and the communication signals will be transferred to a voice-communicating IC U4.

The communication signals are transferred either through a transistor Q1 if said communication signals are pulses, or through a resistor R1 and a transistor Q3, if the communication signals are dual-tone multifrequencies (DTMF's). The communicaton signals for effecting communication over the transmitter and receiver of the handset 30 are pre-selected.

During communication, if an unexpected situation requires an interuption or pause in the conversation, by pressing down the "HOLD" key 112, a bias current will be produced and flow into transistors Q5 and Q6 through a resistor R2. As a result of the conduction made by the transistors Q5 and Q6, a current will flow into a music IC U2 through the resistors R3, R4 and R5 so as to produce music for the enjoyment of the party placed on hold. Meanwhile, because of the forward current flowing from resistors R3 and R4, a light-emitting diode D10 will also be lit for indicating the condition of the "HOLD" key 112.

The IC U3, as shown in FIG. 4, is a dialing control circuit used for controlling the encoded dialing signals to be transmitted therefrom. An oscillating crystal X1 coupled with the dialing control IC U3 is adapted to provide an oscillating frequency of 3.58 MHZ for the IC U3.

Because the telephone circuit arrangement and communication operations described above and illustrated with reference to FIG. 4 are identical with the arrangement and operations of a conventional telephone set, further details are omitted for simplicity.

An important feature of the present invention lies in the arrangement of the photocoupled diode P1 and the flickering circuit 7, together with the transparent member 12, (as shown in FIGS. 1 and 2). As shown in FIG. 4, when an external signal source is received from lines L1 and L2, the photocoupled diode P1 will be activated for transmitting a signal source to a phototransistor Q0 of the flickering circuit 7. There by, the phototransistor Q0 is turned on with a proper bias being impressed across the base of the transistor Q7 which is then energized for transferring the signal source to a first light-emitting element 71 connected to the emitter of the transistor Q7 through a resistor R7 and to a second light-emitting element 72 through another transistor Q10. As a result flickering illuminations accompany the ringing sound produced from the ringing circuit 2.

It is to be noted that, because a plurality of light-emitting elements 102 (which correspond to the reference numerals 71 and 72 of FIG. 4), are arranged in the flickering circuit 7, an external power supply 8 (as shown in FIG. 3), must be connected thereto for providing the light emitting elements 102 with the required power (the external power supply 8 can be made available from a battery source installed in the associated telephone set). Wherein the positive terminal of the external power supply 8 is connected to the positive end of a capacitor C2 in the flickering circuit 7 while the negative end of the external power supply 8 is fixed at one end of a switch 81 (which is electrically associated with the external power socket 17 in the phone housing 10, as shown in FIG. 1). During normal operations, the external power supply 8 is connected to the flickering circuit 7 through switch 81. When external signals coming from the lines L1 and L2 activate the ringing circuit 2, the photocoupled diode P1 transmits a signal for energizing the photocoupled transistor P2 which in turn activates the transistor Q7 in conduction. As a result, flickering of the light-emitting element 71 accompanies the incoming ringing signals. When the handset 30 is picked up, a switch HK', which is in coaxial relation with the hookswitch 3, will be closed along with the activation of the voice-communicating IC U4. Then, a signal from the voice-communicating IC U4 is fed into a first-stage transistor Q8 and amplified therein for being transferred to a second-stage transsitor Q9. Since the second-stage transistor Q9 is arranged as an inverter thereat, the phase of the input amplified signal will be changed and output to a third transistor Q10 through a coupled R-C circuit thereof for activating light-emitting elements 72 coupled with the third-stage transistor Q10 (it is preferable that the third-stage transistor Q10 is a power-type transistor in order to bear the flow of a strong current for the light-emitting elements 72). The magnitude of the current flowing into the light-emitting elements 72 is under control of the voice-communicating IC U4 which, in turn, is governed by the voices of both the calling and called parties. Therefore, when the voice level of either party is high or low, the signals from the voice-comunicating IC U4 will in turn be high or low and the current flowing into the light-emitting elements 72 through the transistors Q8, Q9 and Q10 will be strong or weak. As a result, the different flickering illumination conditions occur through the transparent member 12 of the phone housing 10. (It shall be appreciated that the configuration of the voice-communicating IC U4 can be made to achieve a reverse signal transmission effect, i.e. when the talking voice is high, the output signal thereof is low, and a weak flickering illumination of the light-emitting elements 72 result, and vice versa.)

Moreover, as shown in FIGS. 2 and 4, the light-emitting elements 102 on the circuit board 101 can be arranged in different colors with different patterns in conjunction with the transparent member 12 of the phone housing 10. When the incoming signals from lines L1 and L2 activate the ringing circuits 2 to ring the bell of the associated telephone set, a flickering illumination pattern will also be present at the same time, which is suitable for signalling anyone with either normal hearing or hearing handicaps. In addition, during the communication, the differently arranged light-emitting elements 102 will be activated to flicker according to the magnitude of the voices of both communicating parties, which adds a special aesthetic quality to the associated telephone set.

The above described and illustrated preferred embodiment resides in the following features:

(1) A simple structure and novel configuration make the associated telephone set more aesthetically pleasing than conventional telephone sets, while increasing the commercial value thereof.

(2) The light-emitting elements can be optionally arranged in different colors and patterns so as to satisfy the various requirements of various environments.

(3) The illuminated flickering signal can be used alone for those who are either hard of hearing or very sensitive about the ringing sound of a telephone.

While a preferred embodiment has been illustrated and described, it will be apparent that many changes and modifications may be made in the general construction and arrangement of the invention without departing from the spirit and scope threof. It is therefore desired that the invention be limited not to the exact disclosure but only to the extent of the appending claims.

What is claimed is:

1. A flickering device for telephone sets having a phone housing, a keyboard provided on a top surface of said phone housing, a handset removably attached to said phone housing, a circuit board with a ringing circuit, a hookswitch, a dialing circuit, a selective circuit and a voice-communicating circuit respectively disposed thereon, provided in said phone housing and electrically connected to said keyboard and said handset for initiating operations therewith, the flickering device comprising:

transparent means provided as a portion of said phone housing and disposed in an open section of said phone housing;

flickering illumination means having a plurality of first light-emitting elements disposed on said circuit board in conjunction with said transparent means and electrically coupled with said ringing circuit and said voice-communicating circuit for being separately activated to flicker in response to a ringing signal from said ringing circuit and a voice-communicating signal from said voice-communicating circuit during a telephone communication, said flickering illumination means including, a photocoupled diode electrically connected to an output of said ringing circuit for being energized to transmit a signal source therefrom, photocoupled transistor means coupled between said photocoupled diode and at least one of said plurality of first light-emitting elements for receiving said signal source from said photocoupled diode and activating said at least one first light-emitting element to initiate flickering illuminations thereat and said photocoupled diode in response to said signal source, a plurality of second light-emitting elements electrically connected with said voice-communicating circuit through a plurality of transistors arranged in different stages for being activated to initiate flickering illuminations corresponding to a speaking voice from said voice-communicating circuit, and switching means electrically coupled with said photocoupled transistors means and said hookswitch for initiating signal transferring and power supply operations thereof; and external power supply means electrically connected to said flickering illumination means for providing a power supply for said plurality of first and second light-emitting elements and electrically coupled with said switching means whereby, flickering illuminations will be initiated during ringing operations and during communication conversations.

2. A flickering device for telephone sets according to claim 1, wherein said at least one first light-emitting element and said plurality of first and second light-emitting elements comprise light-emitting diodes and neon lights in a plurality of colors and patterns optionally arranged in connection with said transparent means.

* * * * *